United States Patent
Guo et al.

(10) Patent No.: US 11,279,787 B2
(45) Date of Patent: Mar. 22, 2022

(54) METHOD OF MAKING A GRAFT POLYMER

(71) Applicant: Rohm and Haas Company, Collegeville, PA (US)

(72) Inventors: Hailan Guo, Warrington, PA (US); Morris Wills, Philadelphia, PA (US)

(73) Assignee: Rohm and Haas Company, Collegeville, PA (US)

( * ) Notice: Subject to any disclaimer, the term of this patent is extended or adjusted under 35 U.S.C. 154(b) by 114 days.

(21) Appl. No.: 16/763,773

(22) PCT Filed: Dec. 3, 2018

(86) PCT No.: PCT/US2018/063549
§ 371 (c)(1),
(2) Date: May 13, 2020

(87) PCT Pub. No.: WO2019/125742
PCT Pub. Date: Jun. 27, 2019

(65) Prior Publication Data
US 2020/0369817 A1    Nov. 26, 2020

Related U.S. Application Data

(60) Provisional application No. 62/609,667, filed on Dec. 22, 2017.

(51) Int. Cl.
| | | |
|---|---|---|
| C08F 287/00 | (2006.01) | |
| C08F 220/18 | (2006.01) | |
| C08F 2/10 | (2006.01) | |
| C08F 210/02 | (2006.01) | |
| C08F 210/14 | (2006.01) | |
| C08F 212/08 | (2006.01) | |
| C08F 220/14 | (2006.01) | |
| C08L 51/06 | (2006.01) | |

(52) U.S. Cl.
CPC .............. *C08F 287/00* (2013.01); *C08F 2/10* (2013.01); *C08F 210/02* (2013.01); *C08F 210/14* (2013.01); *C08F 212/08* (2013.01); *C08F 220/14* (2013.01); *C08F 220/1804* (2020.02); *C08F 220/1812* (2020.02); *C08L 51/06* (2013.01)

(58) Field of Classification Search
CPC ............................. C08F 287/00; C08F 220/14
See application file for complete search history.

(56) References Cited

U.S. PATENT DOCUMENTS

| | | | |
|---|---|---|---|
| 4,595,726 A | 6/1986 | Klosiewicz | |
| 4,692,992 A | 9/1987 | Hsu | |
| 4,957,974 A | 9/1990 | Ilenda et al. | |
| 5,247,024 A * | 9/1993 | Natoli | C08F 255/00 525/243 |
| 2006/0199914 A1 * | 9/2006 | Harris | C08F 297/086 525/242 |
| 2014/0323656 A1 * | 10/2014 | Hu | C08L 53/00 525/88 |
| 2020/0385505 A1 * | 12/2020 | Guo | C08L 51/06 |

FOREIGN PATENT DOCUMENTS

| | | |
|---|---|---|
| JP | H03273014 | 12/1991 |
| WO | 2006102016 A2 | 9/2006 |
| WO | 2013101404 | 7/2013 |

* cited by examiner

*Primary Examiner* — Mark S Kaucher
(74) *Attorney, Agent, or Firm* — Brian L. Mutschler

(57) ABSTRACT

Provided is a process for forming a polymer composition, wherein the process comprises
  (a) providing a slurry in an aqueous medium, wherein the slurry comprises
    (i) pellets comprising a polyolefin block copolymer, wherein the block copolymer comprises a crystalline block and an amorphous block,
    (ii) one or more vinyl monomers,
    (iii) one or more initiator,
    wherein the slurry comprises, by weight based on the total weight of the slurry, 0 to 0.01% of all surfactants, and 0 to 0.01% of all water-soluble polymers; and
  (b) polymerizing the one or more vinyl monomers.

6 Claims, No Drawings

METHOD OF MAKING A GRAFT POLYMER

Polyolefin block copolymers are useful for a variety of purposes. However, the surface of such polyolefins is generally not compatible with polar species. This incompatibility is manifest is a variety of situations. For example, most paints and inks are complicated compositions that contain polar compounds. Typical paints and inks do not properly wet the surface of an article made from a polyolefin block copolymer. For another example, if a polyolefin block copolymer were blended with a polar polymer such as an acrylic copolymer, an article made from such a blend would typically exhibit stress whitening, which indicates that the polar polymer does not adhere well to the polyolefin block copolymer. It is desired to find a way to modify a polyolefin block copolymer so that the modified product had improved compatibility with polar species. More specifically, it is desired that the modified polyolefin block copolymers have one or both of the following improvements over unmodified polyolefin block copolymers: a wider variety of paints or inks wet the surface and adhere to the surface of modified polyolefin block copolymers than wet and adhere to the surface of unmodified polyolefin block copolymers; and blends of modified polyolefin block copolymers with acrylic polymers show less stress whitening than do blends of unmodified polyolefin block copolymers with acrylic polymers.

U.S. Pat. No. 5,247,024 describes process for preparation of a segmented copolymer of a polyolefin. U.S. Pat. No. 5,247,024 does not describe the use of polyolefin block copolymers. Also, the process of U.S. Pat. No. 5,247,024 requires the use of a dispersant and is performed in a pressure vessel. It is desired to provide an improved process and an improved modified polyolefin. It is desired to provide a process that has one or more of the following advantages: a dispersant is not required, and/or a pressure vessel is not required.

The following is a statement of the invention.

A first aspect of the present invention is a process for forming a polymer composition, wherein the process comprises
(a) providing a slurry in an aqueous medium, wherein the slurry comprises
  (i) pellets comprising a polyolefin block copolymer, wherein the block copolymer comprises a crystalline block and an amorphous block,
  (ii) one or more vinyl monomers,
  (iii) one or more initiator,
  wherein the slurry comprises, by weight based on the total weight of the slurry, 0 to 0.01% of all surfactants, and 0 to 0.01% of all water-soluble polymers; and
(b) polymerizing the one or more vinyl monomers.

A second aspect of the present invention is a polyolefin block copolymer having covalently attached residues of one or more vinyl monomer selected from the group consisting of one or more (meth)acrylic monomers, one or more vinyl aromatic monomers, and mixtures thereof.

The following is a detailed description of the invention.

As used herein, the following terms have the designated definitions, unless the context clearly indicates otherwise.

A "polymer," as used herein is a relatively large molecule made up of the reaction products of smaller chemical repeat units. Polymers may have structures that are linear, branched, star shaped, looped, hyperbranched, crosslinked, or a combination thereof; polymers may have a single type of repeat unit ("homopolymers") or they may have more than one type of repeat unit ("copolymers"). Copolymers may have the various types of repeat units arranged randomly, in sequence, in blocks, in other arrangements, or in any mixture or combination thereof. Polymers have weight-average molecular weight of 1,000 daltons or higher. Polymers that are sufficiently crosslinked that they become insoluble in any solvent are considered to have infinite molecular weight.

A block copolymer is a polymer having polymerized units of two different monomers, labeled M1 and M2. In a block copolymer, there is at least one sequence (called an "M1 block") of 10 or more polymerized units of M1 that are bonded directly to each other and at least one sequence (called an "M2 block") of 10 or more polymerized units of M2 that are bonded directly to each other. 90 mole % or more of the polymerized units of M1 are located within an M1 block, and 90 mole % or more of the polymerized units of M2 are located within an M2 block. A block copolymer has at least one M1 block and at least one M2 block, and optionally has more than one M1 block and optionally has more than one M2 block.

Some block copolymers have additional blocks of additional different monomers beyond M1 and M2. Some block copolymers may optionally have a block that, instead of having only M1 polymerized units, has a statistical mixture of M1 units and units of a third monomer, M3, as long as 90% or more of the polymerized units of M3 are within the a block of mixed M1 and M3 (that is, few or no polymerized units of M3 are found within the M2 block). Similarly, polymerized units a fourth monomer M4 may be found within the M2 blocks but not within the M1 blocks.

Block copolymers in which all of the blocks are bonded to each other to form a single line are linear block copolymers. Other block copolymers may have branches.

A polymer is herein labeled a graft polymer under the following conditions. Molecules of a monomer, labeled herein MGRAFT, are reacted with an original polymer, and many of the molecules of MGRAFT become covalently bound to the original polymer, either by being directly bound to the original polymer or by being bound to a chain of one or more mutually covalently bound units of MGRAFT, where that chain is directly bound to the original polymer.

Molecules that can react with each other to form the repeat units of a polymer are known herein as "monomers." The repeat units so formed are known herein as "polymerized units" of the monomer.

Vinyl monomers have the structure

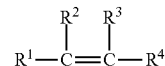

where each of $R^1$, $R^2$, $R^3$, and $R^4$ is, independently, a hydrogen, a halogen, an aliphatic group (such as, for example, an alkyl group), a substituted aliphatic group, an aryl group, a substituted aryl group, another substituted or unsubstituted organic group, or any combination thereof. Vinyl monomers are capable of free radical polymerization to form polymers.

An olefin monomer is a monomer that is a hydrocarbon having one or more carbon-carbon double bond and having no aromatic rings.

A polymer having more than 50% by weight polymerized units of olefin monomers is a polyolefin. Vinyl aromatic monomers are vinyl monomers in which one or more of $R^1$, $R^2$, $R^3$, and $R^4$ contains one or more aromatic rings. (Meth)

acrylate means acrylate or methacrylate. (Meth)acrylic means acrylic or methacrylate. (Meth)acrylic monomers are monomers selected from acrylic acid, methacrylic acid, alkyl esters thereof, substituted-alkyl esters thereof, amides thereof, N-substituted amides thereof, acrylonitrile, methacrylonitrile, and mixtures thereof. Substituents may be, for example, hydroxyl groups, alkyl groups, aromatic groups, groups containing non-aromatic carbon-carbon double bonds, or other groups, or combinations thereof.

An alpha-olefin is a hydrocarbon having 3 or more carbon atoms and having exactly one carbon-carbon double bond, which is located at a terminal carbon atom. That is, in an alpha-olefin, at least one of the two carbon atoms in the carbon-carbon double bond also has two hydrogen atoms attached.

A dispersion is a collection of particles that are distributed throughout a continuous liquid medium. A continuous liquid medium is an aqueous medium if the liquid medium is 80% or more water by weight based on the weight of the liquid medium.

A compound is said herein to be insoluble in a solvent if the amount of that compound that will dissolve in one liter of that solvent at 20° C. is 5 grams or less. If more than 5 grams of a compound will dissolve in one liter of the solvent at 20° C., that compound is said herein to be soluble in that solvent.

An initiator is a compound that, when exposed to initiation conditions, produces radical moieties that are capable of initiating free-radical polymerization. The nature of the initiation condition varies among initiators. Some examples: thermal initiators produce radical moieties when heated to a sufficiently high temperature; and photoinitiators produce radical moieties when exposed to radiation of sufficiently short wavelength and sufficiently high intensity. As another example, a redox initiator is a pair of molecules that react together in an oxidation/reduction reaction to produce radical moieties; initiation conditions obtain when both members of the pair are present and can react with each other.

Polymer compositions may be crystalline or amorphous or a combination thereof. The amorphous portion of a polymer composition may be characterized by one or more glass transition temperatures (Tg), which are measured by differential scanning calorimetry (DSC), at a scan rate of 10° C./min, using the inflection point method. The crystalline portion of a polymer composition may also be characterized by DSC at 10° C./min. If an crystalline exotherm peak appears in the DSC analysis, the polymer composition is considered to be partly or fully crystalline, and the extent of crystallinity is assessed by the area under the crystalline exotherm peak (in Joules) divided by the mass of the sample (in grams).

As used herein, a "non-aqueous solvent" is a compound that is liquid over a temperature range that includes the range of 18° C. to 30° C. and that is not water.

As used herein, a surfactant is a compound having a molecule that contains both a hydrophobic portion and a hydrophilic portion. Hydrophobic portions typically contain one or more chemical groups that have 8 or more carbon atoms bonded to each other to form a linear structure, a branched structure, a cyclic structure, or a combination thereof. Hydrophilic portions typically contain an ionic group or a —$(CH_2CH_2O)_n$— group, where n is 2 or more. A group is ionic if there is some value or range of values of pH between 3 and 11 such that, when the compound is in contact with water at that pH, 50 mole % or more of the groups are in an ionic state.

As used herein, a slurry is a composition in which solid particles that are not soluble in water are distributed in an aqueous medium. The particles may be of any size. The distribution may or may not be stable. That is, mechanical agitation (such as, for example, stirring) may or may not be required to prevent the particles from either settling to the bottom of the container or floating to the top surface.

The present invention involves a polyolefin block copolymer that contains a crystalline block and an amorphous block. Preferably the polyolefin block copolymer contains polymerized units of ethylene or one or more alpha-olefins or a combination thereof. More preferably all of the polymerized units of the polyolefin block copolymer are polymerized units of ethylene or one or more alpha-olefins or a combination thereof.

Preferably the crystalline block of the polyolefin block copolymer contains polymerized units of ethylene or propylene or a mixture thereof; more preferably contains polymerized units of ethylene. Preferably, the crystalline block contains few or no polymerized units of monomers other than ethylene and propylene. That is, in the crystalline block, either there are no polymerized units of monomers other than ethylene and propylene, or else the amount of polymerized units of monomers other than ethylene and propylene, by weight based on the weight of the crystalline block, is 0.1% or less; more preferably 0.01% or less; more preferably 0%.

The amount of crystallinity is assessed by observing the crystalline exotherm in DSC at 10° C./min, and calculating the weight % of crystalline polymer based on the known enthalpy of crystallization of the crystalline block. Preferably the amount of crystallinity in the polyolefin block copolymer is 5 to 25%.

Preferably the amorphous block of the polyolefin block copolymer contains polymerized units of one or more alpha-olefin having four or more carbon atoms; more preferably contains polymerized units of one or more alpha-olefin having six or more carbon atoms; more preferably contains polymerized units of one or more alpha-olefin having eight or more carbon atoms. Preferably the amorphous block of the polyolefin block copolymer contains polymerized units of one or more alpha-olefin having twelve or more carbon atoms; more preferably contains polymerized units of one or more alpha-olefin having ten or fewer carbon atoms.

Preferably, the Tg of the amorphous block is 20° C. or lower; more preferably 0° C. or lower; more preferably −20° C. or lower; more preferably −40° C. or lower.

The soluble portion of the polyolefin block copolymer may be determined as follows. A sample of the polyolefin block copolymer of original weight WPO0 is extracted with solvent. The solvent is then evaporated and weighed, and the weight (WPOSOL) of the residue is the soluble portion of the polyolefin block copolymer. The soluble weight fraction of the polyolefin block copolymer (POSF) is then

POSF=WPOSOL/WPO0.

Preferably, polyolefin block copolymer is used that has POSF of 50% or less; more preferably 25% or less; more preferably 10% or less; more preferably 5% or less; more preferably 2% or less.

The present invention involves a slurry in an aqueous medium, where the slurry contains pellets comprising the polyolefin block copolymer. Preferably the amount of polyolefin block copolymer in the pellets is, by weight based on the weight of the pellets, 80% or more; more preferably 90% or more; more preferably 95% or more. The weight of the pellets refers to the weight of the "dry" pellets, which is determined after water and any other compounds having boiling point of 150° C. or lower are removed from the pellets.

The pellets may be any size or shape. The size of pellets may be characterized by the size of a mesh screen through which the pellets do or do not pass. Preferably 80% or more of the pellets by weight, when dry, would pass through a screen having openings of 12.7 mm Preferably 80% or more of the pellets by weight, when dry, would fail to pass through a screen having openings of 2 mm.

The amount of pellets in the slurry is, by weight of dry pellets based on the weight of water in the slurry, 5% or more; more preferably 10% or more. The amount of pellets in the slurry is, by weight of dry pellets based on the weight of water in the slurry, 40% or less; more preferably 30% or less.

The aqueous medium of the slurry preferably contains water in an amount, by weight based on the weight of the aqueous medium, of 80% or more; preferably 90% or more; more preferably 95% or more; more preferably 98% or more.

The slurry optionally also contains non-aqueous solvent. Preferred non-aqueous solvents are not soluble in water. Preferred non-aqueous solvents are chosen so that, if dry pellets that contain polyolefin block copolymer were placed into contact with an excess amount of non-aqueous solvent, the pellets would swell but would not dissolve in the non-aqueous solvent. Preferably, when a non-aqueous solvent is used, each vinyl monomer that is used is soluble in the non-aqueous solvent. Suitable non-aqueous solvents may be chosen from alkanes, aromatic hydrocarbons, aliphatic ketones, monohydric alcohols of 5 carbons or more, and mixtures thereof. Preferred non-aqueous solvents are aromatic hydrocarbons; more preferred are benzene, toluene, tert-butyl benzene, toluene, and mixtures thereof; more preferred is toluene.

Preferably, a non-aqueous solvent is chosen that swells the pellets. Preferably, when an amount of non-aqueous solvent is 50% or less by weight based on the weight of the pellets, the portion of the non-aqueous solvent that is located within the pellets is, by weight based on the total weight of non-aqueous solvent, 50% or more; more preferably 75% or more; more preferably 90% or more.

The slurry either contains no surfactant or else contains a relatively small amount of surfactant. The amount of surfactant in the slurry, by weight based on the total weight of the slurry, is 0 to 0.01%; preferably 0 to 0.001%.

The slurry either contains no water soluble polymer or else contains a relatively small amount of water soluble polymer. The amount of water soluble polymer in the slurry, by weight based on the total weight of the slurry, is 0 to 0.01%; preferably 0 to 0.001%. In compositions other than the slurry of the present invention, a water soluble polymer is sometimes used as a dispersant. Some common water soluble polymers that are used are copolymers of (meth) acrylic esters and (meth)acrylic acid.

The slurry of the present invention contains one or more vinyl monomer. Preferred monomers are vinyl aromatic monomers, (meth)acrylic monomers, and mixtures thereof. Among vinyl aromatic monomers, preferred are styrene and alkyl-substituted styrenes. Among (meth)acrylic monomers, preferred are substituted and unsubstituted alkyl esters of (meth)acrylic acid. Among substituted alkyl esters of (meth) acrylic acid, preferred are those with a substituent on the alkyl group selected from hydroxyl groups, amine groups, and glycidyl groups; more preferred are hydroxy groups and glycidyl groups; more preferred are hydroxyl groups. Preferred are unsubstituted alkyl esters of (meth)acrylic acid. Preferably, no monomer is used that has a carboxyl group, either in acid form or in salt form.

In some preferred embodiments (herein "all-VAM" embodiments), all of the monomers are vinyl aromatic monomers. In all-VAM embodiments, the amount of non-aqueous solvent is, by weight based on the weight of the dry pellets that contain polyolefin block copolymer plus the weight of all vinyl monomer, preferably 50% or less; more preferably 20% or less; more preferably 10% or less; more preferably zero.

In other preferred embodiments (herein "(meth)acrylic") embodiments, the vinyl monomer comprises one or more (meth)acrylic monomer. In some (meth)acrylic embodiments, the amount of (meth)acrylic monomer is, by weight based on the total weight of vinyl monomer, 50% or more; or 75% or more; or 100%. Among (meth)acrylic embodiments, the amount of non-aqueous solvent is, by weight based on the weight of the dry pellets that contain polyolefin block copolymer plus the weight of all vinyl monomer, preferably 5% or more; more preferably 10% or more; more preferably 20% or more. Among (meth)acrylic embodiments, the amount of non-aqueous solvent is, by weight based on the weight of the dry pellets that contain polyolefin block copolymer plus the weight of all vinyl monomer, preferably 100% or less; more preferably 75% or less; more preferably 50% or less.

Preferably, the total amount of vinyl monomer used is, by weight based on the dry weight of the pellets plus the weight of all vinyl monomer, 5% or more; more preferably 10% or more; more preferably 15% or more; more preferably 20% or more. Preferably, the total amount of vinyl monomer used is, by weight based on the dry weight of the pellets plus the weight of all vinyl monomer, 60% or less; more preferably 50% or less.

The slurry contains one or more initiator. Preferred initiators are diacyl compounds, peroxides, peresters, and peracids; more preferred are peroxides. Preferred initiators are not water soluble. Preferred initiators are peroxyester, having the structure

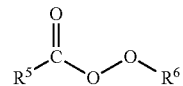

where $R^5$ and $R^6$ are each independently a hydrocarbon group; more preferably an alkyl group; more preferably an alkyl group with 2 or more carbon atoms; more preferably an alkyl group with 3 or more carbon atoms. Preferably $R^5$ and $R^6$ are each independently an alkyl group with 18 carbon atoms or fewer. Two preferred initiators are t-butylperoxy 2-ethylhexanoate and t-amyl peroxypivalate.

Preferred initiators are thermal initiators. Thermal initiators may be characterized by the temperature (T1) that gives a 1-hour half-life. Preferred initiators have T1 of 100° C. or lower; more preferably 95° C. or lower. Preferred initiators have T1 of 60° C. or higher; more preferably 70° C. or higher.

The total amount of initiator used is preferably, by weight based on the total amount of vinyl monomer used, 0.3% or more; more preferably 0.5% or more; more preferably 1% or more; more preferably 2% or more. The total amount of initiator used is preferably, by weight based on the total amount of vinyl monomer used, is 10% or less; more preferably 7% or less; more preferably 5% or less.

Preferably, the vinyl monomer in the slurry is polymerized. Preferably, all of the pellets and all of the non-aqueous solvent are added to the slurry prior to addition of vinyl monomer. The slurry is mechanically agitated, preferably by stirring, if necessary to keep the pellets distributed in the aqueous medium. Then vinyl monomer is preferably then added to the slurry. Polymerization of the vinyl monomer is then conducted, either during or after the process of adding vinyl monomer to the slurry, or a combination of during and after the process of adding vinyl monomer to the slurry.

Polymerization is conducted by providing the presence of initiator and by establishing conditions under which the initiator produces radicals. Preferably, the initiator is a thermal initiator, and establishing conditions under which the initiator produces radicals involves raising the temperature. Preferably, an initiator is chosen that does not produce enough radicals to cause detectable polymerization at 25° C. but does produce enough radicals to cause detectable polymerization at 85° C. or higher.

One suitable method of conducting the polymerization is to provide a slurry of pellets that contain polyolefin block copolymer, to add non-aqueous solvent (if used) to the slurry, and to heat the slurry to a temperature TSLURRY of 60° C. or above. Preferably TSLURRY is 70° C. or above; more preferably 80° C. or above; more preferably 85° C. or above. Preferably, while the slurry is kept at temperature TSLURRY, both vinyl monomer and initiator are gradually added to the slurry. One preferred method is to form a mixture at room temperature (approximately 23° C.) of all the desired vinyl monomers and all the desired initiator, and then gradually add that mixture to the slurry.

A preferred method of conducting the polymerization is to make a mixture of polyolefin block copolymer, non-aqueous solvent (if used), monomer, and initiator, at a temperature below 30° C. Preferably, the temperature of making this mixture is more than 20° C. below T1, the temperature at which the half-life of the initiator is 1 hour. This mixture may optionally be allowed to stand at room temperature while the polyolefin block copolymer becomes swollen by the other ingredients. Preferably the ingredients are chosen so that the liquids that swell the polyolefin block copolymer particles does not cause the polyolefin block copolymer particles to fuse with each other. Then water is added and stirred to form a slurry of the swollen polyolefin block copolymer particles. Then the slurry is heated to a temperature, preferably 70° C. to 95° C., sufficient to cause the initiator to create enough radicals to start the polymerization. The temperature to which the slurry is heated is preferably equal to or larger than a temperature that is 20° C. below T1 and is preferably equal to or less than a temperature that is 20° C. above T1.

When vinyl monomer is gradually added to the slurry, the time required (TADD) from the start of adding vinyl monomer until the completion of addition of vinyl monomer is preferably 5 minutes or more; more preferably 10 minutes or more; more preferably 15 minutes or more. Preferably TADD is 2 hours or less; more preferably 1 hour or less.

Preferably, after polymerization of the vinyl monomer, both the non-aqueous solvent and the water are removed from the slurry. In preferred embodiments, the slurry is heated to 95° C. and the non-aqueous solvent is removed, for example by steam distillation Then, preferably, the pellets are separated from the slurry by filtration, and the pellets are then dried, for example in a vacuum oven, for example at 60° C.

Preferably the polymerization of vinyl monomer is conducted at atmospheric pressure. That is, preferably the polymerization is done in a vessel that has openings to the ambient atmosphere or otherwise allows the pressure in the vessel to maintain the same pressure as the ambient atmosphere. The ambient atmosphere normally has pressure of 0.8 to 1.1 atmosphere.

The polymerization of the vinyl monomer is considered herein to be a complex process that involves both the polymerization of vinyl monomers with each other and the attachment of vinyl monomers to the polyolefin block copolymer. Vinyl monomers that have become attached to the polyolefin block copolymer may be in the form of individual vinyl monomers attached directly to the polyolefin block copolymer or may be in the form of long or short chains of polymerized vinyl monomers, where the chain of polymerized vinyl monomers has one or more covalent bond that attaches it to the polyolefin block copolymer.

The amount of vinyl monomer that is attached (labeled "percent grafting") to the polyolefin block copolymer is assessed as follows. The weight of dry polyolefin block copolymer prior to grafting is WPO1. As defined above, the soluble weight fraction in the polyolefin block copolymer prior to grafting is POSF. The weight of all vinyl monomers added to the slurry is WMON. The initial weight of grafted pellets is WGR1. The grafted pellets are extracted with solvent, and then the solvent is evaporated and the weight of the residue is the weight of the dissolved materials WGRSOL. The dissolved materials WGRSOL contain soluble materials both from the original polyolefin block copolymer and from the soluble residues of the vinyl monomers and reaction products thereof. The percent grafting is then % grafting=100*[WGRSOL−(POSF)*(WPO1)]/WMON Sometimes, due to small unavoidable error in measurements, the % grafting appears to be greater than 100%. In such cases, the % grafting is deemed herein to be 100%.

Preferably, the % grafting is 50% or higher; more preferably 75% or higher; more preferably 88% or higher; more preferably 95% or higher.

Preferably, after polymerization, polymerized units of the one or more vinyl monomer are distributed uniformly throughout the pellets. The uniformity may be studied by cutting open a cross section of a pellet and using scanning electron microscopy with energy dispersive spectroscopy (SEM/EDS) to study the distribution of one or more elements along a radial line of the cross section. A sample at the center may be compared to a sample at a distance 0.9*R, where R is the radial distance. Preferably the ratio of the concentration of polymerized units of vinyl monomer to the concentration of polymerized units of vinyl monomer at 0.9*R is from 0.8:1 to 1.2:1.

Preferably, the polymerized units of vinyl monomer form small, round domains of polymerized units of vinyl monomer, surrounded by polyolefin block copolymer. Preferably, the average domain of polymerized units of vinyl monomer has no dimension larger than 250 nm. The domains of polymerized units of vinyl monomer may be characterized by cutting a cross section of a pellet and then studying the surface of the cross section using atomic force microscopy.

While the present invention is not limited to any specific mechanism, the following mechanism of polymerization is contemplated. The initiator produces a radical that abstracts a hydrogen from a carbon atom located in the amorphous block of the polyolefin block copolymer. This abstraction creates a radical attached to the polyolefin block copolymer, and that radical initiates polymerization of the vinyl monomer, which polymerizes in a chain of monomers that grows out from the polyolefin block copolymer.

The following are examples of the present invention.

The following abbreviations are used:

LMA=lauryl methacrylate

BMA=butyl methacrylate

MMA=methyl methacrylate t-BPO=t-butyl peroctoate (also called t-butyl peroxy-2-ethylhexanoate) peroxyester (TRIGONOX™ 21 S from Akzo Nobel)

PO=polyolefin

PO-B1=ethylene/1-octene block copolymer

PO-B2=ethylene/1-octene block copolymer, different from PO-B1

PO-S1=ethylene/1-octene statistical copolymer

PO-S2=ethylene/1-octene statistical copolymer, different from PO-S1

Ex=Example

Samples were made using one of two methods, "A" or "B." In method A, 140 g of polyolefin pellets were added to 1000 g of water (with either 0 g or 60 g of toluene), and the resulting reaction mix was heated to 85° C. The monomer mix (60 g monomers plus t-BPO) was added over 30 minutes. The amount of t-BPO was 3% by weight based on monomers. After the addition of the monomer mix, the reaction was held at 85° C. for 1 hour, then 95° C. for 1 hour (toluene, if present, was removed during the heat up from 85-100° C. with a Dean-Stark trap). The mixture was ten cooled and filtered. The pellets were dried in a vacuum oven at 60° C. In all inventive examples, approximately 200 g of polymer was removed (100% yield).

In method B, the same amounts of polyolefin pellets, solvent (if used), monomer, and initiator were used as in Method A. In method B, the polyolefin pellets, solvent (if used), monomer, and initiator were mixed together at 23° C., and then water was added at room temperature, and then the slurry was heated to 85° C.

The percent grafting was determined as described above, using either tetrahydrofuran (THF) or toluene; both solvents gave the same results. Samples were swelled 2 hr at 25 C then separated and dried.

EXAMPLE 1: GRAFTING WITH (METH)ACRYLIC MONOMERS

The following graft compositions using methacrylic monomers were made using method A as follows. The amounts shown are weight percent based on total polymer (polyolefin block copolymer plus all vinyl monomers). Example numbers beginning with "C" are comparative. "nm" means not measured.

TABLE 1

| | | | Grafting with (meth)acrylic monomers | | | | | |
|---|---|---|---|---|---|---|---|---|
| Ex | PO | % PO | % LMA | % BMA | % MMA | % Toluene | % grafting | notes |
| 1 | PO-B1 | 70 | 9 | 0 | 21 | 0 | nm | (1) |
| 2 | PO-B1 | 70 | 9 | 0 | 21 | 30 | 100 | (2) |
| 3 | PO-B1 | 70 | 0 | 30 | 0 | 30 | 100 | (3) |
| C4 | PO-S1 | 100 | 0 | 0 | 0 | 30 | nm | (4) |
| 5 | PO-B1 | 70 | 0 | 0 | 30 | 30 | 100 | (2) |
| C6 | PO-S1 | 100 | 0 | 0 | 0 | 0 | nm | (6) |
| C7 | PO-S2 | 70 | 21 | 0 | 9 | 0 | 100 | (7) |

(1) Monomers did not swell the pellets, reaction was not performed.
(2) Final pellets look good.
(3) Final Pellets felt slightly sticky when warm.
(4) Pellets swelled too much by the toluene. Pellets fused together when water was heated prior to monomer addition. Graft reaction not performed.
(6) Pellets fused in water when heated.
(7) Pellets appeared to swell when monomer was added, but the pellets agglomerated. Graft reaction was not performed.

Comparative examples C4, C6, and C7 used a polyolefin polymer that was a statistical copolymer and not a block copolymer. All swelled so badly that a grafting reaction could not be conducted.

Samples similar to those described in Table 1, using (meth)acrylic monomers for grafting, were made using method B. The resulting materials were equivalent to those described in Table 1.

EXAMPLE 2: GRAFTING WITH STYRENE MONOMER

Grafting was conducted with styrene as the vinyl monomer, using method B. Toluene was used for swelling during the polymerization. The other solvents were used in the test for % grafting. The amounts shown are weight percent based on total polymer (polyolefin block copolymer plus all vinyl monomers). Results were as follows:

TABLE 2

| | | Grafting with Styrene | | | |
|---|---|---|---|---|---|
| Ex | PO | % PO | % styrene | % Toluene | test solvent | % grafting |
| C8A | PO-B2 | 100 | 0 | 0 | THF$^{(8A)}$ | nm |
| C8B | PO-B2 | 100 | 0 | 0 | toluene$^{(8B)}$ | nm |
| 9 | PO-B2 | 85 | 15 | 30 | toluene | 92.8 |
| 10 | PO-B2 | 85 | 15 | 0 | toluene | 99.4 |
| 11 | PO-B2 | 85 | 15 | 0 | toluene | 97.1 |
| 12 | PO-B2 | 85 | 15 | 15 | toluene | 99.5 |
| 13 | PO-B2 | 85 | 15 | 15 | toluene | 99.7 |

$^{(8A)}$soluble fraction 0.92% by weight based on the original weight of PO-B2
$^{(8B)}$soluble fraction 0.99% by weight based on the original weight of PO-B2

Styrene monomer grafts well, with or without toluene. The highest level of toluene had high % grafting (92.8%), but that level was less high than samples grafted using less toluene or no toluene.

EXAMPLE 3: COMPATIBILITY WITH ACRYLIC POLYMER

Two samples were prepared by blending polyolefin block copolymer with acrylic polymer particles (Acrylic-1). The Acrylic-1 had core of crosslinked poly(BA) and a shell of poly(MMA).

To make comparative example C14, PO-B1 (80% by weight) plus Acrylic-1 (20% by weight) were processed with a two roll mill (Collin Mill (W. H. Collin GmbH Maschienefabrik, Aichach, Germany) at 185° C. for 5 minutes. After the milling was completed, the molten polymer was peeled from the metal rolls, and compression molded into 500 micrometer thick sheet with a CARVER™ press (Carver Press Inc., Menomonee Falls, Wis.) under the conditions of an operating temperature of 180° C. and pressing conditions of 5000 psi for 3 minutes, followed by 20000 psi for 2 minutes, and a 5-minute cooling period (at 23° C., room temperature) at 20000 psi.

To make example Ex 15, the material Ex 5 (80% by weight) plus Acrylic-1 (20% by weight), was milled and pressed by the same method as comparative example C14.

For each of C14 and Ex 15, a rectangle was cut from the pressed plaque and placed in a mechanical tensile tester and stretched in the longest direction. After removal from the tensile tester, the appearance of the sample was as follows:

TABLE 3

Blends with acrylic polymer

| Example | PO Type | PO wt % | Acrylic-1 wt % | Observation |
|---|---|---|---|---|
| C14 | PO-B1 | 80 | 20 | extreme stress whitening throughout the elongated portion of the sample |
| 15 | Ex 5 | 80 | 20 | no stress whitening |

Table 3 shows that polyolefin block copolymer that is grafted with (meth)acrylic monomers (Ex 5) is much more compatible with other acrylic polymers than is un-grafted polyolefin block copolymer (PO-B1).

EXAMPLE 4—PAINTABILITY

Paintability Sample Preparation:

The dried grafted pellets of Ex 1 were placed into a metal mold and pressed into thin plaque with a thickness of 3.2 mm (⅛ inch). A CARVER press (Carver Press Inc., Menomonee Falls, Wis.) was used with an operating temperature of 185° C. and pressing conditions of 2.268 tons for 3 minutes, followed by 9.07 tons for 2 minutes, and a 5-minute cooling period (23° C.) at 9.07 tons. Dried pellets of PO-B1 were milled and pressed in the same way.

Paintability was tested as follows: Water-based dyne pen (EnerDyne, made by Enercon Industries Corp., Menomonee Falls, Wis. USA) was used to test the surface energy of the plaque sample.

TABLE 4

Paintability Test

| Sample ID | Dyne Pen reading |
|---|---|
| Grafted PO | 32 |
| Neat PO | <30 |

The higher reading on the Dyne Pen shows that the surface of the grafted sample will more readily receive paint or ink than does the surface of the ungrafted polyolefin block copolymer.

The invention claimed is:

1. A process for forming a polymer composition, wherein the process comprises
    (a) providing a slurry in an aqueous medium, wherein the slurry comprises
        (i) pellets comprising a polyolefin block copolymer, wherein the block copolymer comprises a crystalline block and an amorphous block,
        (ii) one or more vinyl monomers,
        (iii) one or more initiator,
        wherein the slurry comprises, by weight based on the total weight of the slurry, 0 to 0.01% of all surfactants, and 0 to 0.01% of all water-soluble polymers; and
    (b) polymerizing the one or more vinyl monomers.

2. The process of claim 1, wherein the vinyl monomer comprises one or more (meth)acrylate monomer, and wherein the slurry further comprises
    (iv) one or more non-aqueous solvent.

3. The process of claim 1, wherein the vinyl monomer comprises one or more vinyl aromatic monomer.

4. The process of claim 1, wherein the polymerizing is conducted by a method that comprises making a mixture at a temperature below 30° C. comprising the pellets, the vinyl monomer, and the initiator, in the absence of water, and then adding water to the mixture to create the slurry, and then heating the slurry to a temperature above 30° C.

5. The process of claim 1, wherein the one or more initiators comprises a thermal initiator, and the slurry is at a temperature high enough to cause the initiator to produce sufficient radicals to initiate polymerization of the vinyl monomer.

6. The process of claim 1, wherein the process is conducted at atmospheric pressure.

* * * * *